United States Patent
Hafvenstein et al.

(10) Patent No.: US 10,798,863 B2
(45) Date of Patent: Oct. 13, 2020

(54) INPUT SOURCE AND SPEED BASED CONTROL OF TRACK-WIDTH IN A SELF-PROPELLED AGRICULTURAL PRODUCT APPLICATOR

(71) Applicant: CNH Industrial America LLC, New Holland, PA (US)

(72) Inventors: David J. Hafvenstein, Benson, MN (US); James Beaucaire, Wheaton, IL (US)

(73) Assignee: CNH Industrial America LLC, New Holland, PA (US)

( * ) Notice: Subject to any disclaimer, the term of this patent is extended or adjusted under 35 U.S.C. 154(b) by 264 days.

(21) Appl. No.: 15/855,085

(22) Filed: Dec. 27, 2017

(65) Prior Publication Data

US 2019/0191614 A1    Jun. 27, 2019

(51) Int. Cl.
| | |
|---|---|
| *A01B 63/00* | (2006.01) |
| *B60B 35/10* | (2006.01) |
| *A01C 23/04* | (2006.01) |
| *A01M 7/00* | (2006.01) |
| *A01M 21/04* | (2006.01) |

(52) U.S. Cl.
CPC .......... *A01B 63/006* (2013.01); *A01C 23/047* (2013.01); *B60B 35/109* (2013.01); *B60B 35/1054* (2013.01); *B60B 35/1063* (2013.01); *A01M 7/0057* (2013.01); *A01M 21/043* (2013.01); *B60B 2900/3315* (2013.01); *B60B 2900/351* (2013.01); *B60Y 2200/22* (2013.01)

(58) Field of Classification Search
CPC . A01B 60/006; A01C 23/047; B60B 35/1054; B60B 35/1063; B60B 35/109; B60B 2900/3315; B60B 2900/351; A01M 7/0057; A01M 21/043; B60Y 2200/22
See application file for complete search history.

(56) References Cited

U.S. PATENT DOCUMENTS

| | | | | |
|---|---|---|---|---|
| 5,401,055 A | * | 3/1995 | Pham | ..................... B62D 61/02 180/209 |
| 5,454,583 A | * | 10/1995 | Torborg | .............. B60B 35/1054 180/209 |
| 6,990,399 B2 | | 1/2006 | Hrazdera et al. | |

(Continued)

FOREIGN PATENT DOCUMENTS

| | | |
|---|---|---|
| EP | 2 058 154 B1 | 4/2012 |
| WO | 2015/090618 A2 | 6/2015 |

*Primary Examiner* — Behrang Badii
*Assistant Examiner* — Daniel L Greene
(74) *Attorney, Agent, or Firm* — Rebecca L. Henkel; Rickard K. DeMille

(57) ABSTRACT

A track-width adjustment system, apparatus and method limit track-width adjustments in a self-propelled product applicator, according to a first speed-based protocol for track-width adjustments initiated by an operator of the applicator, and according to a second speed-based protocol for track-width adjustments initiated by an automatic track-width control arrangement of the applicator. An automatic track-width control arrangement continually monitors and adjusts track-width, as required to maintain a desired track-width at substantially any ground speed while the applicator is in motion. Operator initiated adjustments to track-width are allowed only within a prescribed range of ground speeds.

11 Claims, 4 Drawing Sheets

(56) References Cited

U.S. PATENT DOCUMENTS

| | | |
|---|---|---|
| 7,163,227 B1 | 1/2007 | Burns |
| 7,460,942 B2 * | 12/2008 | Mailer ................. A01B 69/004 |
| | | 342/357.76 |
| 7,954,583 B2 | 8/2011 | Coers et al. |
| 8,042,817 B2 | 10/2011 | Motebennur et al. |
| 8,376,078 B2 | 2/2013 | Hiddema |
| 8,398,179 B2 | 3/2013 | Mackin et al. |
| RE45,405 E | 3/2015 | Humpal et al. |
| 9,266,394 B2 | 2/2016 | Hannukalnen et al. |
| 9,346,497 B2 | 5/2016 | Dames et al. |
| 9,352,782 B2 | 5/2016 | Tollefsrud et al. |
| 2007/0164583 A1 | 7/2007 | Jong |
| 2015/0102568 A1 * | 4/2015 | Slawson ............. B60G 17/005 |
| | | 280/5.514 |
| 2015/0102569 A1 * | 4/2015 | Slawson .................. B60G 3/01 |
| | | 280/5.514 |
| 2015/0102570 A1 * | 4/2015 | Slawson ............. B60G 17/005 |
| | | 280/6.157 |
| 2015/0102571 A1 * | 4/2015 | Slawson .................. B60G 3/01 |
| | | 280/6.157 |
| 2015/0102593 A1 * | 4/2015 | Slawson ............ B62D 49/0607 |
| | | 280/830 |
| 2016/0009135 A1 * | 1/2016 | Jong ...................... B60B 35/10 |
| | | 280/5.52 |
| 2016/0176231 A1 | 6/2016 | Daffue |
| 2016/0227698 A1 | 8/2016 | Ballu |
| 2016/0234992 A1 * | 8/2016 | Clifford ............... A01B 63/006 |

\* cited by examiner

INPUT SOURCE AND SPEED BASED CONTROL OF TRACK-WIDTH IN A SELF-PROPELLED AGRICULTURAL PRODUCT APPLICATOR

FIELD OF THE INVENTION

This invention generally relates to self-propelled agricultural product applicators, and more particularly to controlling track-width adjustment in self-propelled agricultural product applicators.

BACKGROUND OF THE INVENTION

Agricultural chemicals and fertilizers must be applied within very narrow time windows for maximum effectiveness. In some cases, this means that application must be performed after the crops have emerged, and sometimes even after the crops have grown to a height of several feet tall. To apply chemicals and fertilizers without damaging standing crops specialized self-propelled agricultural product applicators, having high ground clearance, such as so-called high-boy sprayers or dry product applicators, are often utilized with standing crops. The high ground clearance allows the applicator to move through the standing crops without damaging them.

Such high ground clearance applicators also typically utilize independent drive and suspension systems for each wheel of the applicator, and provide some means for adjusting the track width of the wheels to match the row spacing of the crop being treated. Since the row spacing varies for different types of crops, and as a matter of custom in various locations, such self-propelled applicators also typically include some apparatus for adjusting the track width to match the row spacing. It is also common practice to adjust the wheels of an applicator in, to a minimum track width position, during transport of the applicator on a trailer or while being driven on a public road. The axle must then be adjusted back out to a track width matching the crop to be treated, before proceeding into the field.

Track-width adjustment systems can be manually operable, but for ease of operation it is more typical to include a powered arrangement for adjusting track width, through use of some form of actuator, such as a hydraulic cylinder, for extending and retracting one or more axles of the applicator in a direction transverse to the direction of travel of the applicator.

In the past, some forms of powered adjustable axles in self-propelled applicators have required an operator to manually hold a button in the cab for a period of time while driving the applicator to move the axle toward a desired position, and then stop and dismount the applicator to check wheel position against a scale attached to the axle. If the axle is not properly positioned, this procedure was repeated until the axle was finally properly positioned. In other prior axle positioning approaches, a motion transducer arrangement was utilized to detect and count pulses generated as the axle moved relative to the transducer, as an indication of how far the axle had moved from a starting point. Such systems do not directly measure a current position of the axle, however, and must generally be cycled through an undesirable calibration process to re-zero the motion detecting transducer each time the axle is repositioned after the applicator has been powered down and re-started.

Prior approaches to powered axle position adjustment have also typically included a number of interlock provisions restricting when and how an operator could initiate and accomplish a desired change in track width. Such interlock provisions have often negatively impacted operation of prior axle positioning system in various automatic modes of operation.

It is desirable, therefore, to provide and improved powered track-width adjustment apparatus and method for use in a self-propelled agricultural applicator.

BRIEF SUMMARY OF THE INVENTION

The invention provides an improved track-width adjustment system, apparatus and method, that limit track-width adjustments in a self-propelled product applicator, according to a first speed-based protocol for track-width adjustments initiated by an operator of the applicator, and according to a second speed-based protocol for track-width adjustments initiated by an automatic track-width control arrangement of the applicator. The automatic track-width control arrangement may continually monitor and adjust track-width, as required to maintain a desired track-width at substantially any ground speed while the applicator is in motion. Operator initiated adjustments to track-width may be allowed only within a prescribed range of ground speeds.

In one form of the invention, a track-width adjustment system is provided for a self-propelled agricultural product applicator configured for traversing a ground surface at a ground speed. The applicator has a frame supported above the ground surface by a pair of ground engaging wheels defining a track-width of the applicator. The wheels are operatively joined to the frame of the applicator by an adjustable width axle structure including at least one selectively movable axle member supported from the frame, and movable relative to the frame for adjusting the track-width spacing between the ground engaging wheels.

The track-width adjustment system may have a track-width adjustment control arrangement that includes a track-width adjustment actuator arrangement, a position sensing arrangement, a ground speed detecting arrangement, and a track-width controller that is operatively connected between the track-width adjustment actuator arrangement, the position sensing arrangement, and the ground speed detecting arrangement.

A track-width adjustment system, according to the invention, may include a track-width control arrangement for one or more wheels of the applicator. Where a track width adjustment system includes a track-width control arrangement for one or more wheels of the applicator, in accordance with the invention, the ground speed detecting arrangement, and/or the track-width controller may be shared by two or more of the track-width control arrangements.

A track-width adjustment actuator arrangement, according to the invention, may be operatively attached between the frame and the at least one selectively movable axle member for adjusting a position of the at least one selectively movable axle member relative to the frame. A position sensing arrangement, according to the invention, may be operatively attached between the frame and the at least one selectively movable axle member for detecting a current position of the at least one selectively movable axle member relative to the frame. And, a ground speed detecting arrangement, according to the invention, may be mounted on the frame for detecting a current ground speed of the applicator.

A track-width controller, according to the invention, may include an automatic track-width control arrangement, and be configured for receiving a desired track-width signal from an operator. The track-width controller may also be configured for receiving a current position signal from the position sensing arrangement indicative of the current position of the movable axle member relative to the frame, and for receiving a current ground speed signal form the ground speed detecting arrangement that is indicative of a current ground speed of the applicator. The track-width controller may be further configured for comparing the current position signal to the desired track-width signal and sending a track-width control signal to the track-width adjustment actuator arrangement, as required, for causing the track-width adjustment actuator arrangement to adjust and maintain the movable axle member at a current position corresponding to the desired track width signal. The track width controller may be yet further configured to control track-width adjustments according to a first speed-based protocol for operator initiated track-width adjustments, and according to a second speed-based protocol for track-width adjustments initiated by the automatic track-width control arrangement of the applicator.

In some forms of the invention, according to the first speed-based protocol, operator initiated adjustments to track-width may be allowed only within a prescribed range of ground speeds. In some forms of the invention, the track-width controller may continually monitor and adjust track-width according to the second speed-based protocol, as required to maintain a desired track-width, at substantially any ground speed while the applicator is in motion.

In some track-width adjustment systems, according to the first speed-based protocol, operator initiated adjustments to track-width may be allowed only within a prescribed range of ground speeds, and, according to the second speed-based protocol, the track-width controller may continually monitor and adjust track-width, as required to maintain a desired track-width, at substantially any ground speed while the applicator is in motion.

The track width controller, in some forms of the invention, may be configured to adjust track-width, as required to maintain a desired track-width, at any time the applicator is travelling substantially at or above a ground speed of 0.5 miles per hour, and the track-width controller may be further configured to allow operator initiated adjustments to track-width only when the applicator is travelling substantially at or within a range of ground speeds defined as 0.5 miles per hour to 5.0 miles per hour.

A position sensing arrangement, according to the invention, may be configured and operatively attached between the frame and the at least one selectively movable axle member for continuously detecting and providing a signal indicative of the current position of the at least one selectively movable axle member relative to the frame. A track-width controller, in some forms of the invention, may be configured for continually monitoring the current position signal at a rapid periodic rate, and for initiating an automatic adjustment to the current position of the movable axle member whenever the current position deviates from the desired position by a value substantially equal to, or exceeding a predetermined threshold deviation value.

The invention may also take the form of a self-propelled agricultural product applicator having a track width adjustment system including a track-width adjustment control arrangement according to the invention.

The invention may further take the form of a method for adjusting track-width in a self-propelled agricultural product applicator by selectively adjusting the track width using a track-width adjustment system in accordance with the invention.

Other aspects, objects and advantages of the invention will be apparent from the following detailed description and accompanying drawings of exemplary embodiments of the invention.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain exemplary embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
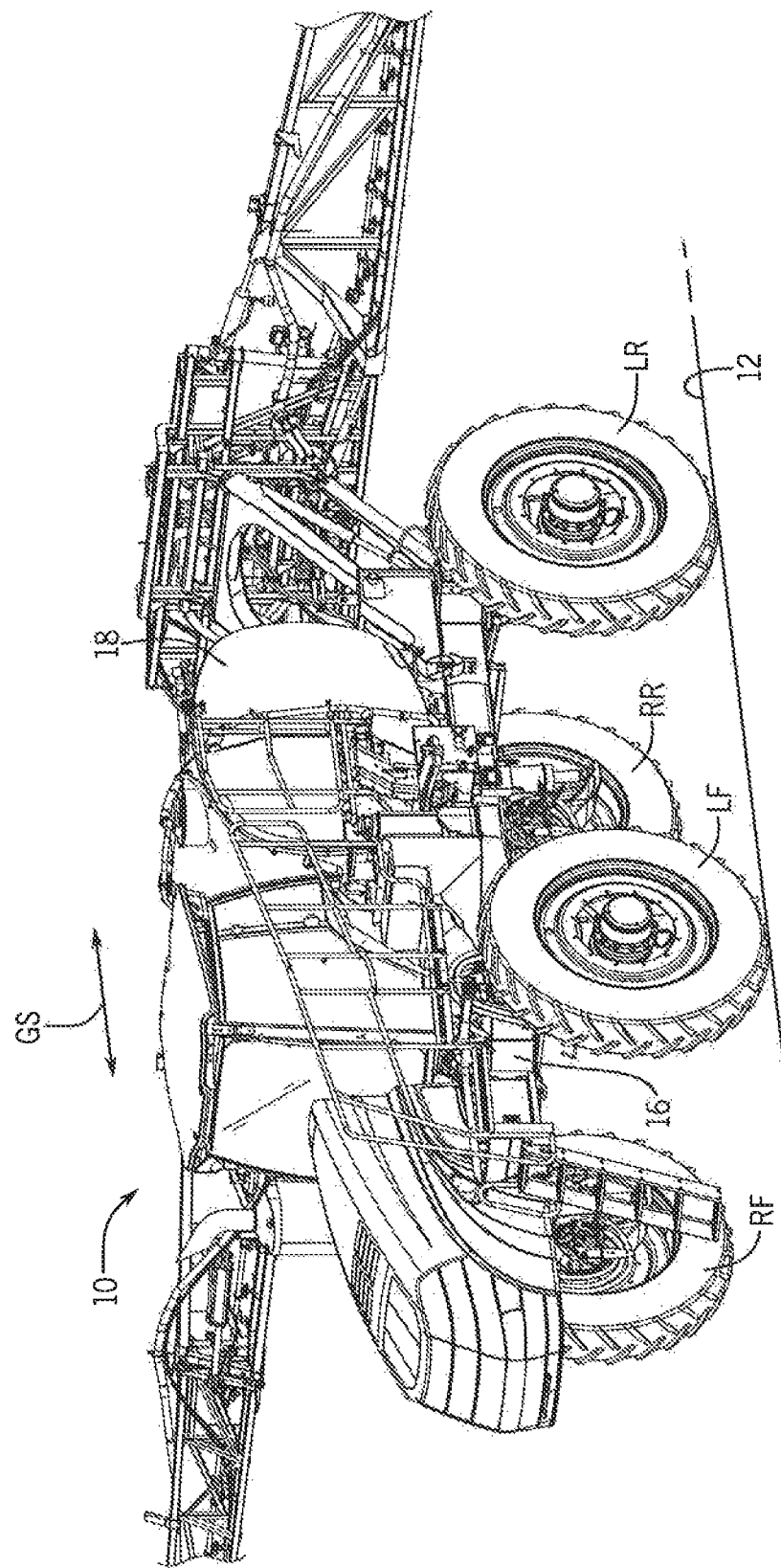
FIG. 1 is an isometric illustration of an exemplary embodiment of a self-propelled agricultural product applicator, according to the invention.

FIG. 1 shows a first exemplary embodiment of a self-propelled agricultural product applicator 10, according to the invention. The applicator 10 has a configured for traversing a ground surface 12 at a ground speed, as indicated by an arrow GS in FIG. 1. The applicator 10 has a frame 16 that is supported above the ground surface 12 by four ground engaging wheels LF,RF,LR,RR. The exemplary embodiment of the applicator 10 is shown in FIG. 1 carrying a sprayer 18, for applying liquid agricultural products, but is configured to alternatively carry other types of agricultural product delivery devices, such as a dry box for spreading dry agricultural products.

Figure 2:
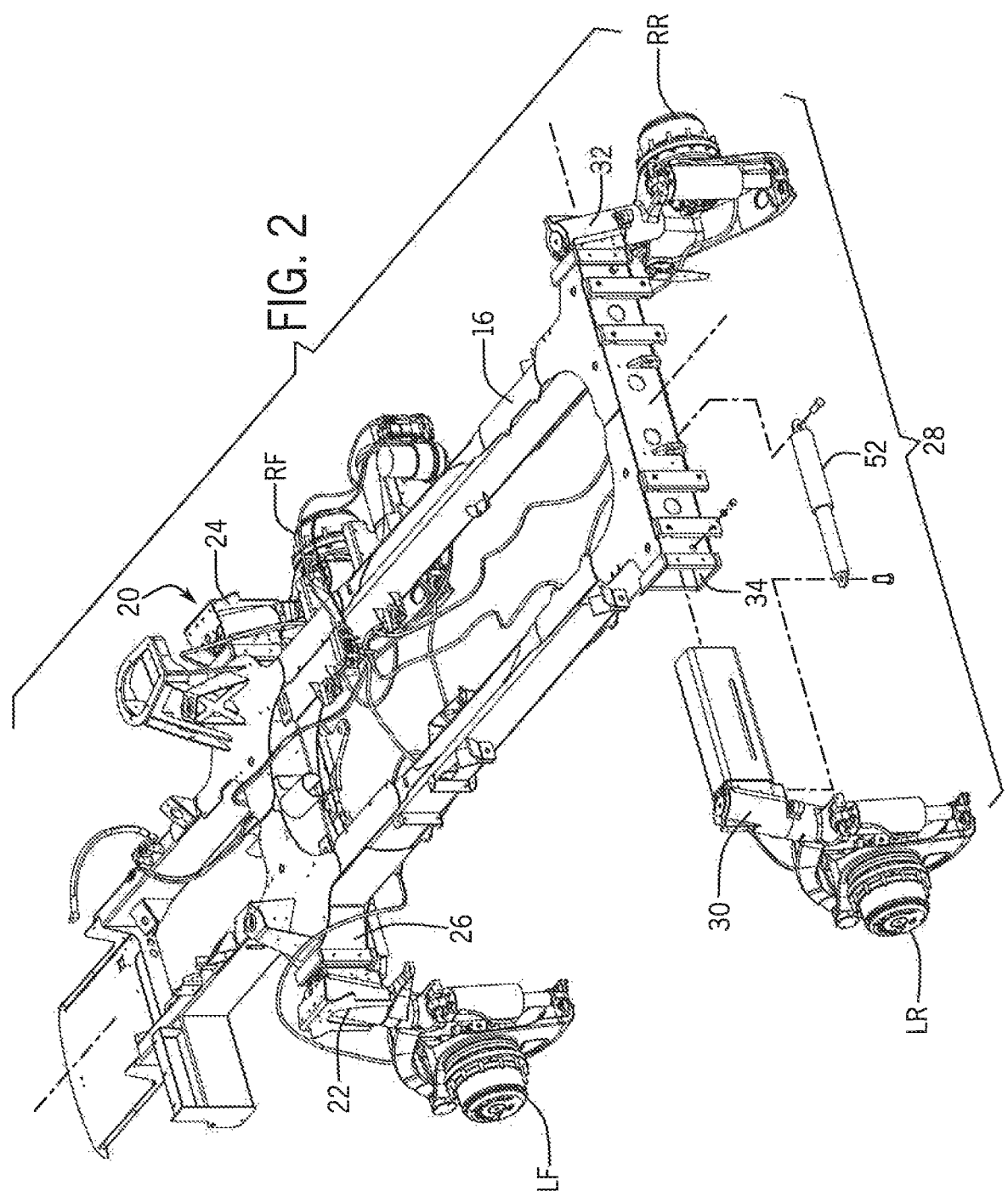
FIG. 2 is a partially exploded isometric illustration of a frame of the applicator of FIG. 1, and an axle structure having a movable axle member connected to the frame.

As shown in FIG. 2, the left and right front wheels LF,RF are operatively joined to the frame 16 of the applicator 10 by a front adjustable width axle structure 20. The front axle structure 20 includes respective left and right movable axle members 22,24 that are slidingly supported within a front axle tube 26 of the frame 16, in such a manner that they are selectively movable relative to the frame 16 for adjusting the track-width spacing between the front pair of ground engaging wheels LF,RF.

In similar fashion, as further shown in FIG. 2, the left and right rear wheels LR,RR are operatively joined to the frame 16 of the applicator 10 by a rear adjustable width axle structure 28. The rear adjustable width axle structure 28 includes respective left and right movable axle members 30,32 that are slidingly supported within a rear axle tube 34 of the frame 16, in such a manner that they are selectively movable relative to the frame 16 for adjusting the track-width spacing between the rear pair of ground engaging wheels LR,RR.

In FIG. 2, the left rear movable axle member 30 is shown exploded out of the rear axle tube 34, to more readily illustrate the manner in which the four movable axle members 22,24,30,32 slidably engage with the frame 16 for adjusting the track width of the applicator 10.

Figure 3:
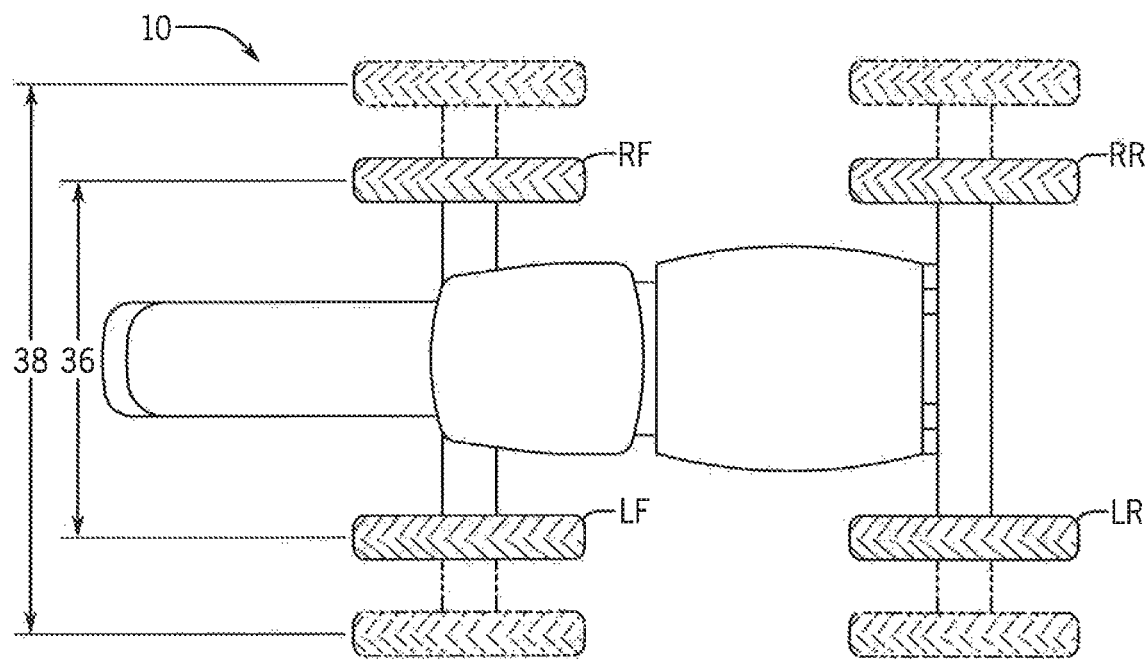
FIG. 3 is an orthographic top view of the applicator of FIG. 1, illustrating maximum and minimum track widths of the applicator.

FIG. 3 illustrates the manner in which the front and rear pairs of wheels LF,RF and LR,RR can be adjusted in and out between a minimum track width 36, whereat the wheels are shown in solid lines in FIG. 3, and a maximum track width 38 whereat the wheels are shown in dashed lines in FIG. 3. In the exemplary embodiment of the applicator 10, the minimum track-width is approximately 120 inches wide, and the maximum track width is approximately 160 inches wide. The track-width can be selectively set anywhere within the range defined by the minimum and maximum track-widths 36,38, to match row widths of crops to which the applicator 10 is applying an agricultural product.

In the exemplary embodiment of the applicator 10 the front and rear adjustable axle structures 20,28, and the movable axle members 22,24,30,32 are all essentially identical. Accordingly, for the sake of brevity, much of the following description with regard to the features of the invention shown in FIGS. 2 and 4 will be illustrated with specific reference to the movable axle member 30 for the left rear wheel LR.

Figure 4:
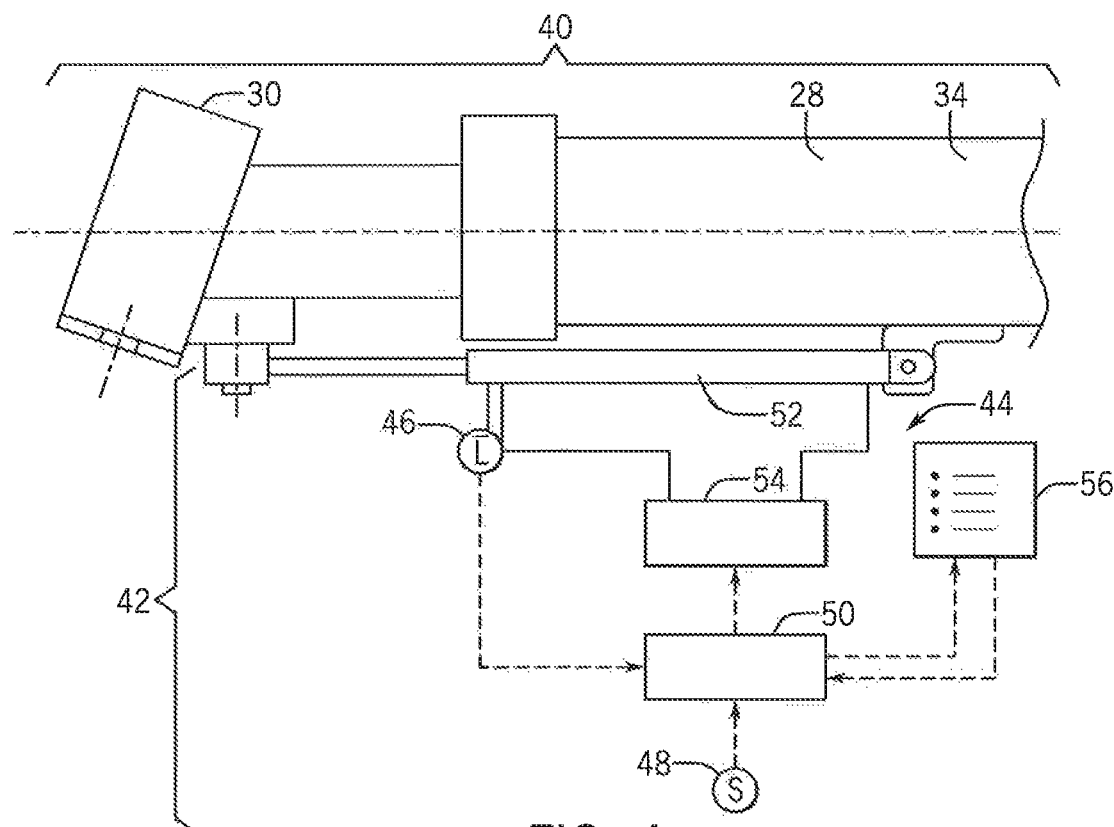
FIG. 4 is a schematic illustration of a portion of a track-width adjustment system of the applicator of FIG. 1.

As illustrated in FIG. 4 specifically for the rear adjustable width axle structure 28, and even more specifically with respect to the left rear movable axle member 30, the exemplary embodiment of the applicator 10 includes a track-width adjustment system 40 having a track-width adjustment control arrangement at each wheel LF,RF,LR,RR of the applicator 10. The track width adjustment control arrangement 42 for the left rear wheel LR includes a track-width adjustment actuator arrangement 44, a position sensing arrangement 46, a ground speed detecting arrangement 48, and a track-width controller 50 that is operatively connected between the track-width adjustment actuator arrangement 44, the position sensing arrangement 46, and the ground speed detecting arrangement 48, in a manner described in more detail below.

The track-width adjustment actuator arrangement 44 for the left rear wheel LR includes a track-width adjustment actuator in the form of a hydraulic cylinder 52, and also includes an electrically controlled hydraulic power supply 54. The hydraulic cylinder 52 is operatively attached, as illustrated in FIGS. 2 and 4, between the rear axle tube 34 of the frame 16 and the left rear movable axle member 30, for adjusting a position of the left rear movable axle member 30 relative to the frame 16, to thereby adjust the current track width WC of the rear wheels LR,RR. The hydraulic power supply 54 is operatively attached to the hydraulic cylinder 52, for supplying a flow of pressurized hydraulic fluid to the cylinder 52, to thereby cause the cylinder 52 to extend and contract for adjusting the position of the left rear movable axle member 30 relative to the frame 16.

In the exemplary embodiment of the applicator 10, the position sensing arrangement 46 is a device, such as an LVDT or Hall effect device, mounted internally within the cylinder 52, and configured to provide a continuous output signal L that is indicative of both the current length of the cylinder 52 the current position of the left rear wheel LR relative to the frame 16.

The ground speed detecting arrangement 48 in the exemplary embodiment of the applicator 10 is a speed sensor mounted in the hydrostatic drive hub of one of the four wheels LF,RF,LR,RR, for detecting a current rotational speed of the drive hub and supplying a current rotational speed signal S to the track-width control unit 50. The track-width controller 50 is configured for computing a current ground speed GS of the applicator 10 over the ground surface 12 from the current rotational speed signal S.

Figure 5:
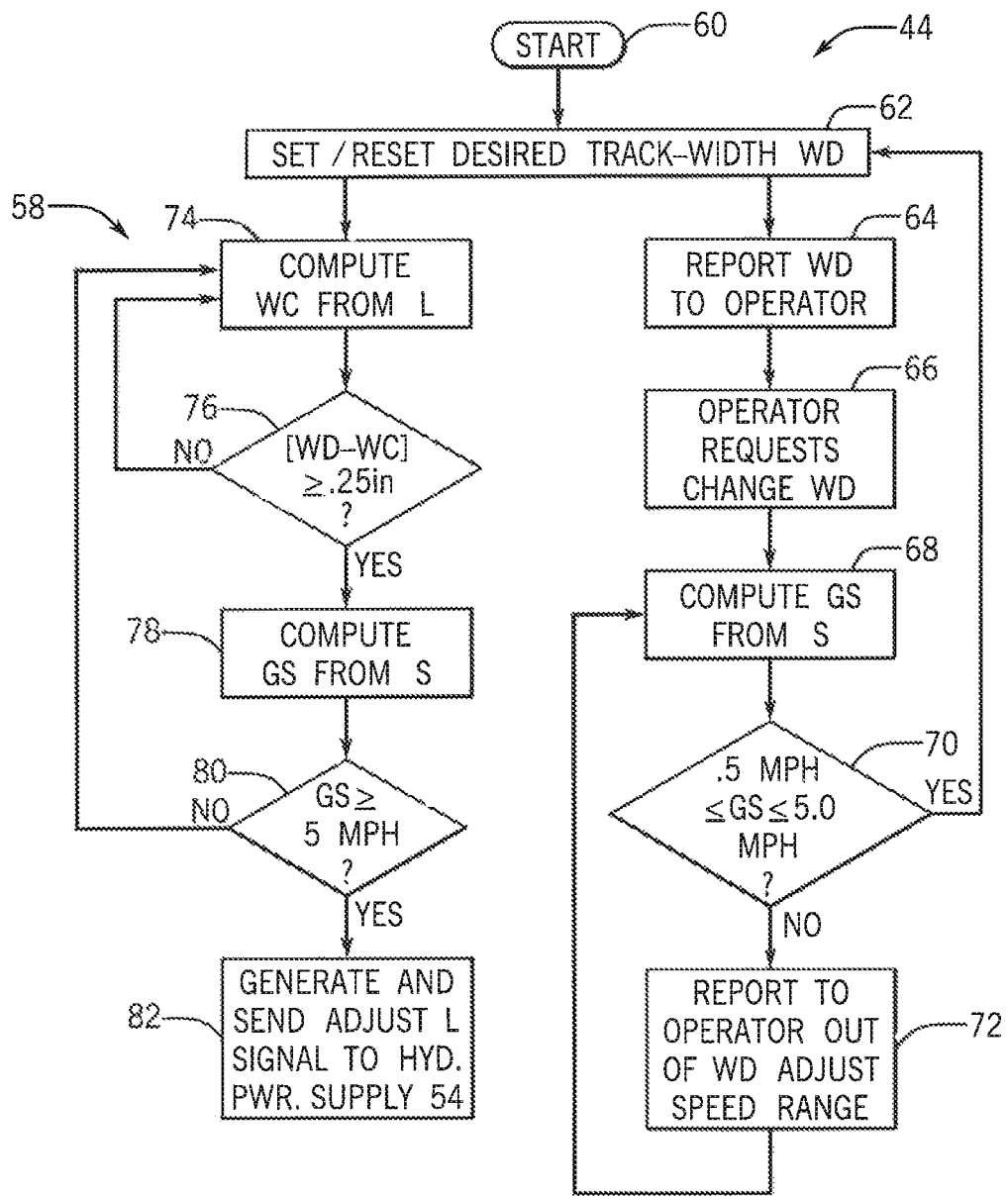
FIG. 5 is a flow chart of a track-width adjustment control arrangement.

As will be described in more detail below with reference to FIG. 5, the track width controller 50 is generally configured in such a manner that the track-width adjustment system 40 in the applicator 10 limits track-width adjustments in the exemplary embodiment of the applicator 10, according to a first speed-based protocol shown in blocks 64-72 for track-width adjustments initiated by an operator of the applicator 10, and according to a second speed-based protocol shown in blocks 74-82 for track-width adjustments initiated by an automatic track-width control arrangement 58 of the applicator 10 that is generally illustrated in FIG. 5 by the combination of functions and elements used in blocks 60,62 and 74-82.

In the exemplary embodiment of the applicator, the track-width control arrangements for the wheels LF,RF,LR,RR continually monitor and utilize the automatic track-width control arrangement 58 in the manner described at 60,62, 74-82 to adjust current track-width WC, as required to maintain a desired track-width WD at substantially any ground speed GS while the applicator 10 is in motion. Operator initiated adjustments to the desired track-width WD, as indicated at 66, may be allowed only within a prescribed range of ground speeds. More specifically, in the exemplary embodiment of the applicator 10, current track width WC may be adjusted by the automatic track-width control arrangement 58 at any time the applicator 10 is moving at a speed of 0.5 miles per hour, or above. Operator initiated adjustments to the desired track-width WD are allowed only within a prescribed range of ground speeds that are greater than or equal to 0.5 miles per hour, up to and including 5.0 miles per hour.

As noted above, the track-width adjustment system 40 in the exemplary embodiment of the applicator 10 includes a track-width control arrangement for each of the wheels LF,RF,LR,RR of the applicator 10, that is identical to track-width control arrangement 42 described above for the left rear wheel LR of the applicator 10. In the track width adjustment system 40 of the exemplary embodiment, the ground speed detecting arrangement 48, the track-width controller 50 and the hydraulic power supply 54 are shared by all four of the track-width control arrangements. Each of the other three track-width control arrangements includes a respective hydraulic cylinder having a respective, integral, internal position sensing arrangement for continuously measuring and reporting a current length of the hydraulic cylinder for that wheel.

As shown at blocks 60 and 62 of FIG. 5, the automatic track-width control arrangement of 60,62 and 74-82 sets an initial value of desired track width WD. Because the position sensing arrangements in the hydraulic cylinders of the exemplary embodiment of the applicator 10 continuously monitor and report cylinder length L for each of the four wheels LF,RF,LR,RR to the controller 50, this can be readily accomplished by having the controller simply compute a value of current track-width WC, and then set the initial desired track width WD value to equal one of a predetermined range of increments of desired track width that is close to the current track width WC. Setting the initial value of WD can also be accomplished be accomplished by a variety of other methods, such as retrieving a prior value of WD stored in memory of the controller 50 the last time that WD was iterated for the applicator 10. As shown at 74 in FIG. 5, the initial value of WD is communicated to blocks 74-82 of the automatic track-width control arrangement 58, and is also reported to the operator at 64 as information displayed on a screen 56, shown in FIG. 4.

As shown at 74, the automatic track width control arrangement continually computes a current value of track width WC from the cylinder length signals L, at a rapid repetition rate of approximately once per second. The arithmetic difference between the computed current track width WD and the desired track width WD is computed at 76, and if the absolute value of that computed difference is less than a predetermined threshold value of 0.25 inches, no adjustment to current track width WC is requested and the automatic track width control arrangement 58 returns to 74.

If the absolute value of the difference between the computed current track width WD and the desired track width WD, as computed at 76, is less greater than, or equal to 0.25 inches, the automatic track width control arrangement moves to 78, computes a current ground speed GS of the applicator 10 from the signal S provided by the ground speed sensor 48, and then moves to 80. If the computed current ground speed GS is less than 0.5 miles per hour, no adjustment of track width is made, and the automatic track width control arrangement 58 returns to 74. If, however, the computed current ground speed GS is greater than, or equal to 0.5 miles per hour, the automatic track width control arrangement 58 moves to 82 and the controller 50 generates and sends appropriate signals to the hydraulic power supply 54 to cause the appropriate hydraulic cylinder for any, or all of the four wheels LF,RF,LR,RR to extend or retract accordingly, to thereby move the wheel or wheels from the current track width position WC to the desired track width position WD.

As the wheel or wheels move, the automatic track width control arrangement 58 continues to iterate at the rapid repetition rate from 74-82, to continually monitor and compare the current track width WC to the desired track width WD, and stop the hydraulic cylinders from further adjusting the current width WC when the current width WC is within 0.25 inches of the desired track width WD.

As shown at 66 in FIG. 5, when the operator initiates a request to change the desired track width WD, using the touchscreen 56 in the cab of the applicator 10, the current ground speed GS of the applicator 10 is computed from the signal S provided by the ground speed sensor 48. At 70, the current ground speed is evaluated to see whether or not it falls within the predetermined speed range of greater than, or equal to 0.5 miles per hour, up to a current ground speed GS that is less than, or equal to 5.0 miles per hour. If the current GS falls within the predetermined speed range, the change in desired track width WD requested by the operator is communicated to 62 where the value of desired track width WD is reset to the new value of WD requested by the operator. On its next iteration, i.e. within about one second, the automatic track width control arrangement 58 will begin moving repeatedly through steps 74-82 until the movable axles are readjusted so that the current track width WC is once again within 0.25 inches of the new desired track width WD.

From the foregoing description of exemplary embodiments, those having skill in the art will appreciate that the invention provides a straightforward and streamlined approach for automatically maintaining track width during operation, and for readjusting track width when desired, in a self-propelled agricultural product applicator, in a manner that provides a number of significant advantages over prior approaches. For example, complex interlock methodologies required in prior approaches have been substantially eliminated in the present invention by using speed-based protocols for track width adjustments initiated by an operator of an applicator that are different from speed-based protocols for track width adjustments that are initiated by an automatic track-width control arrangement of the applicator. Also, by sensing axle position continuously with sensors that provide a direct indication of current track width, much of the complexity of construction, and the need for frequent recalibration inherently required in the motion-based position sensors used in prior approaches is eliminated through practice of the invention.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A track-width adjustment system for a self-propelled agricultural product applicator configured for traversing a ground surface at a ground speed and having a frame supported above the ground surface by a pair of ground engaging wheels defining a track-width of the applicator and operatively joined to the frame of the applicator by an adjustable width axle structure including at least one selectively movable axle member supported from and movable relative to the frame for adjusting the track-width spacing between the ground engaging wheels, the track width adjustment system including a track-width adjustment control arrangement comprising:

a track-width adjustment actuator arrangement operatively connected between the frame and the at least one selectively movable axle member for adjusting a position of the at least one selectively movable axle member relative to the flame;

a position sensing arrangement operatively connected between the frame and the at least one selectively movable axle member for detecting a current position of the at least one selectively movable axle member relative to the frame;

a ground speed detecting arrangement mounted on the frame for detecting a current ground speed of the applicator; and a track-width controller that is operatively connected between the track-width adjustment actuator arrangement, the position sensing, arrangement, and the ground speed detecting arrangement and including an automatic track-width control arrangement, the track-width controller being configured to:

receive a desired track-width signal from an operator, a current position signal from the position sensing arrangement indicative of the current position of the movable axle member relative to the frame, and a current ground speed signal from the ground speed detecting arrangement indicative of a current ground speed of the applicator;

upon receipt of an operator initiated track-width adjustment, compare the current position signal to the desired track-width signal and sending a track-width control signal to the track-width adjustment actuator arrangement to cause the track-width adjustment actuator arrangement to adjust and maintain the movable axle member at a desired position corresponding to the desired track width signal if the current ground speed of the applicator exceeds a threshold; and upon a track-width adjustment initiated by the automatic track-width control arrangement, compare the current position signal to the desired track-width signal and sending a track-width control signal to the track-width adjustment actuator arrangement to cause the track-width adjustment actuator arrangement to adjust and maintain the movable axle member at the desired position corresponding to the desired track width signal if the current ground speed falls within a predetermined range.

2. The track-width adjustment system of claim 1, wherein the a threshold is a ground speed of 0.5 miles per hour, and wherein the predetermined range is a range of ground speeds defined as 0.5 miles per hour to 5.0 miles per hour.

3. The track-width adjustment system of claim 1, wherein the position sensing arrangement is configured and operatively attached between the frame and the at least one selectively movable axle member for continuously detecting and providing a signal indicative of the current position of the at least one selectively movable axle member relative to the frame.

4. The track-width adjustment system of claim 3, wherein the track-width controller is configured for continually monitoring the current position signal at a rapid periodic rate, and for initiating an automatic adjustment to the current position of the movable axle member whenever the current position deviates from the desired position by a value substantially equal to or exceeding a predetermined threshold deviation value.

5. A self-propelled agricultural product applicator configured for traversing a ground surface at a ground speed and having a frame supported above the ground surface by a pair of ground engaging wheels defining a track-width of the applicator and operatively joined to the frame of the applicator by an adjustable width axle structure including at least one selectively movable axle member supported from and movable relative to the frame for adjusting the track-width spacing between the ground engaging wheels, the applicator also including a track width adjustment system including a track-width adjustment control arrangement, the track-width adjustment control arrangement comprising:

a track-width adjustment actuator arrangement operatively attached between the frame and the at least one selectively movable axle member for adjusting a position of the at least one selectively movable axle member relative to the frame;

a position sensing arrangement operatively attached between the frame and the at least one selectively movable axle member for detecting a current position of the at least one selectively movable axle member relative to the frame;

a ground speed detecting arrangement mounted on the frame for detecting a current ground speed of the applicator; and a track-width controller operatively connected between the track-width adjustment actuator arrangement, the position sensing arrangement, and the ground speed detecting arrangement; and including an automatic track-width control arrangement; the track-width controller being configured to:

receive a desired track-width signal from an operator, a current position signal from the position sensing arrangement indicative of the current position of the movable axle member relative to the frame, a current ground speed signal from the ground speed detecting arrangement indicative of a current ground speed of the applicator;

upon receipt of an operator initiated track-width adjustment, compare the current position signal to the desired track-width signal and sending a track-width control signal to the track-width adjustment actuator arrangement to cause the track-width adjustment actuator arrangement to adjust and maintain the movable axle member at a desired position corresponding to the desired track width signal if the current ground speed of the applicator exceeds a threshold; and upon a track-width adjustment initiated by the automatic track-width control arrangement, compare the current position signal to the desired track-width signal and sending a track-width control signal to the track-width adjustment actuator arrangement to cause the track-width adjustment actuator arrangement to adjust and maintain the movable axle member at the desired position corresponding to the desired track width signal if the current ground speed falls within a predetermined range.

6. The self-propelled agricultural product applicator of claim 5, wherein the threshold is a ground speed of 0.5 miles per hour, and is the predetermined range of ground speeds defined as 0.5 miles per hour to 5.0 miles per hour.

7. The self-propelled agricultural product applicator of claim 5; wherein the position sensing arrangement is configured and operatively attached between the frame and the at least one selectively movable axle member for continuously detecting and providing a signal indicative of the current position of the at least one selectively movable axle member relative to the frame.

8. The self-propelled agricultural product applicator of claim 7, wherein the track-width controller is configured for continually monitoring the current position signal at a rapid periodic rate, and for initiating an automatic adjustment to the current position of the movable axle member whenever the current position deviates from the desired position by a value substantially equal to or exceeding a predetermined threshold deviation value.

9. A method for adjusting track-width in a self-propelled agricultural product applicator configured for traversing a ground surface at a ground speed and having a frame supported above the ground surface by a pair of ground engaging wheels defining a track-width of the applicator and operatively joined to the frame of the applicator by an adjustable width axle structure including at least one selectively movable axle member supported from and movable relative to the frame for adjusting the track-width spacing between the ground engaging wheels, the method comprising:

selectively adjusting the track width using a track-width adjustment system including a track-width adjustment control arrangement having a track-width adjustment actuator arrangement, a position sensing arrangement, a ground speed detecting arrangement, and a track-width controller that is operatively connected between the track-width adjustment actuator arrangement, the position sensing arrangement, and the ground speed detecting arrangement;

the track-width adjustment actuator arrangement being operatively attached between the frame and the at least one selectively movable axle member for adjusting a position of the at least one selectively movable axle member relative to the frame;

the position sensing arrangement being operatively attached between the frame and the at least one selectively movable axle member for detecting a current position of the at least one selectively movable axle member relative to the frame;

the ground speed detecting arrangement being mounted on the frame for detecting a current ground speed of the applicator;

the track-width controller including an automatic track-width control arrangement and being configured to:

receive a desired track-width signal from an operator, a current position signal from the position sensing arrangement indicative of the current position of the movable axle member relative to the frame, and a current ground speed signal from the ground speed detecting arrangement that is indicative of a current ground speed of the applicator;

upon receipt of an operator initiated track-width adjustment, compare the current position signal to the desired track-width signal and sending a track-width control signal to the track-width adjustment actuator arrangement to cause the track-width adjustment actuator arrangement to adjust and maintain the movable axle member at a desired position corresponding to the desired track width signal if the current ground speed of the applicator exceeds a threshold; and upon a track-width adjustment initiated by the automatic track-width control arrangement, compare the current position signal to the desired track-width and sending a track-width control signal to the track-width adjustment actuator arrangement to cause the track-width adjustment actuator arrangement to adjust and maintain the movable axle member at the desired position corresponding to the desired track width signal if the current ground speed falls within a predetermined range.

10. The method of claim 9, further comprising configuring and operatively attaching the position sensing arrangement between the frame and the at least one selectively movable axle member fbr continuously detecting and providing a signal indicative of the current position of the at least one selectively movable axle member relative to the frame.

11. The method of claim 10, further comprising configuring the track-width controller for continually monitoring the current position signal at a rapid periodic rate, and for initiating an automatic adjustment to the current position of the movable axle member whenever the current position deviates from the desired position by a value substantially equal to or exceeding a predetermined threshold deviation value.

* * * * *